United States Patent
Narayana et al.

(10) Patent No.: US 12,177,520 B2
(45) Date of Patent: *Dec. 24, 2024

(54) HDMI CUSTOMIZED AD INSERTION

(71) Applicant: Roku, Inc., San Jose, CA (US)

(72) Inventors: Purushottam Narayana, Milpitas, CA (US); Andre Goddard Rosa, Leander, TX (US)

(73) Assignee: ROKU, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/446,596

(22) Filed: Aug. 9, 2023

(65) Prior Publication Data
US 2023/0388589 A1 Nov. 30, 2023

Related U.S. Application Data

(63) Continuation of application No. 17/674,339, filed on Feb. 17, 2022, now Pat. No. 11,785,300.

(51) Int. Cl.
*H04N 21/45* (2011.01)
*G06V 20/40* (2022.01)
(Continued)

(52) U.S. Cl.
CPC ........... *H04N 21/458* (2013.01); *G06V 20/44* (2022.01); *G06V 20/48* (2022.01); *H04N 21/4312* (2013.01); *H04N 21/43635* (2013.01); *H04N 21/44008* (2013.01); *H04N 21/812* (2013.01); *G06V 2201/10* (2022.01)

(58) Field of Classification Search
CPC ............. H04N 21/458; H04N 21/4312; H04N 21/43635; H04N 21/44008; H04N 21/812; H04N 21/4333; H04N 21/44016; H04N 21/47217; G06V 20/44; G06V 20/48; G06V 2201/10
See application file for complete search history.

(56) References Cited

U.S. PATENT DOCUMENTS 7,263,714 B2 * 8/2007 Lowthert ........... H04N 21/4331
348/E7.063
7,692,724 B2 * 4/2010 Arora ..................... G11B 27/10
348/473

(Continued)

*Primary Examiner* — Timothy R Newlin
(74) *Attorney, Agent, or Firm* — Sterne, Kessler, Goldstein & Fox P.L.L.C.

(57) ABSTRACT

Disclosed herein are system, apparatus, article of manufacture, method and/or computer program product embodiments, and/or combinations and sub-combinations thereof, for ad insertion by a display device coupled to a media device via a high-definition media interface (HDMI) connection, where the media device provides media content and/or a control signal. When the media device pauses the media content, the display device can determine that a pause event has occurred and insert an ad shown on the display device. Further, some embodiments include determining the context and/or content of the media content that is paused, and determining an ad that is customized to the determined context and/or content to be displayed on the display device. In some embodiments, the display device can determine additional information from the control signal that may also be used to determine the ad to be displayed on the display device.

20 Claims, 10 Drawing Sheets

(51) Int. Cl.
*H04N 21/431* (2011.01)
*H04N 21/4363* (2011.01)
*H04N 21/44* (2011.01)
*H04N 21/458* (2011.01)
*H04N 21/81* (2011.01)

(56) References Cited

U.S. PATENT DOCUMENTS

| | | | | |
|---|---|---|---|---|
| 8,954,346 B1* | 2/2015 | Walker | | H04N 21/435 |
| | | | | 705/14.66 |
| 9,076,154 B1* | 7/2015 | Song | | G06Q 30/02 |
| 11,082,679 B1* | 8/2021 | Swift | | H04N 21/43079 |
| 11,245,958 B2* | 2/2022 | Cremer | | H04N 21/4396 |
| 2005/0201721 A1* | 9/2005 | Fujita | | G11B 20/00007 |
| | | | | 386/250 |
| 2005/0216932 A1* | 9/2005 | Danker | | G06Q 30/00 |
| | | | | 725/87 |
| 2005/0278751 A1* | 12/2005 | Wada | | H04N 7/166 |
| | | | | 725/62 |
| 2006/0156283 A1* | 7/2006 | Landau | | G06Q 30/0277 |
| | | | | 705/14.54 |
| 2006/0221063 A1* | 10/2006 | Ishihara | | G06F 3/03545 |
| | | | | 348/E9.026 |
| 2007/0154032 A1* | 7/2007 | Kawamura | | G10L 25/78 |
| | | | | 381/94.1 |
| 2007/0192782 A1* | 8/2007 | Ramaswamy | | H04N 21/426 |
| | | | | 725/15 |
| 2007/0230907 A1* | 10/2007 | Takao | | G11B 27/022 |
| | | | | 386/249 |
| 2010/0023960 A1* | 1/2010 | Hasson | | H04H 60/63 |
| | | | | 725/14 |
| 2010/0053452 A1* | 3/2010 | Abe | | H04N 7/163 |
| | | | | 348/700 |
| 2010/0064261 A1* | 3/2010 | Andrews | | G06F 3/04883 |
| | | | | 715/863 |
| 2010/0086277 A1* | 4/2010 | Craner | | H04N 21/4424 |
| | | | | 386/278 |
| 2011/0126102 A1* | 5/2011 | Archer | | H04N 21/472 |
| | | | | 725/35 |
| 2011/0219401 A1* | 9/2011 | Candelore | | H04N 21/4751 |
| | | | | 725/32 |
| 2011/0255840 A1* | 10/2011 | Bornsen | | H04N 21/4147 |
| | | | | 386/239 |
| 2014/0321671 A1* | 10/2014 | An | | H03G 3/02 |
| | | | | 381/109 |
| 2015/0296250 A1* | 10/2015 | Casper | | G06Q 30/0267 |
| | | | | 725/34 |
| 2016/0094600 A1* | 3/2016 | Besehanic | | H04L 65/612 |
| | | | | 709/219 |
| 2016/0150228 A1* | 5/2016 | Greene | | H04N 5/50 |
| | | | | 348/192 |
| 2016/0165059 A1* | 6/2016 | Deng | | H04L 41/5025 |
| | | | | 370/254 |
| 2016/0307371 A1* | 10/2016 | Ayers | | H04N 21/816 |
| 2016/0378276 A1* | 12/2016 | Shah | | H04N 21/8456 |
| | | | | 715/720 |
| 2017/0318339 A1* | 11/2017 | Fichter | | H04N 21/25866 |
| 2019/0019122 A1* | 1/2019 | Allen | | B60W 40/09 |
| 2020/0175548 A1* | 6/2020 | Li | | H04L 67/53 |
| 2021/0105530 A1* | 4/2021 | Lassure | | H04L 65/61 |
| 2021/0144443 A1* | 5/2021 | Joh | | H04N 21/4722 |
| 2021/0400321 A1* | 12/2021 | McClendon, Jr. | | H04N 21/4722 |

* cited by examiner

HDMI CUSTOMIZED AD INSERTION

CROSS-REFERENCE TO RELATED APPLICATIONS

This application is a continuation application of U.S. application Ser. No. 17/674,339, filed Feb. 17, 2022, which is incorporated herein in its entirety.

BACKGROUND

Field

This disclosure is generally directed to inserting ads for display and more particularly to inserting customized ads for display based on paused media content.

Background

Content, such as a movie or TV show, is typically displayed on a television or other display screen for watching by users. Accordingly, a user's experience of the content is typically confined to the TV and to speakers connected to the TV. A user can control the consumption of media services by selecting media content for streaming, playing, pausing, and unpausing streaming media content.

SUMMARY

Provided herein are system, apparatus, article of manufacture, method and/or computer program product embodiments, and/or combinations and sub-combinations thereof, for high-definition multimedia interface (HDMI) customized ad insertion. An example embodiment operates by detecting a pause event in one or more frames (e.g., audio or video frames) received via a HDMI connection, and during the pause event, recognizing content within the one or more frames. Some embodiments include receiving a control signal via the HDMI connection and determining information about the source device, and/or information about the application running on the source device. Some embodiments include determining an ad based on i) the content within the one or more frames, and/or ii) information about the source device and/or information about the application running on the source device. The ad can be displayed on the display device.

Some embodiments include a display device detecting a pause event in one or more frames received via an HDMI connection, and during the pause event, recognizing content within the one or more frames. Some embodiments include determining an ad based on the content within the one or more frames, and presenting the ad on the display device. Detecting the pause event can include: i) receiving a remote control pass through pause signal; ii) detecting a silent audio signal via the HDMI connection, and determining that a video frame of the one or more frames has not changed; and/or iii) detecting a pause icon from the one or more frames using computer vision (CV) technology, and detecting no change from a first video frame to a second video frame, where the first video frame and the second video frame are of the one or more frames.

In some embodiments, recognizing the content includes analyzing a first video frame or a first audio frame of the one or more frames using automatic content recognition (ACR) technology, and determining a fingerprint, a watermark, or a cue tone corresponding to the first video frame or the first audio frame, where the fingerprint, watermark, and/or cue tone is used to identify information about content corresponding to the first video frame or the first audio frame. In some embodiments, recognizing the content includes analyzing a first video frame of the one or more frames using CV technology, and determining metadata corresponding to the first video frame, where the metadata is used to identify one or more objects corresponding to the first video frame.

Some embodiments include receiving a control signal via the HDMI connection and determining service product description (SPD) from the control signal, where the ad is determined based on the SPD. Some embodiments further include detecting an auto low latency mode (ALLM) from the control signal, where the ad is based on the ALLM. Some embodiments further include detecting a variable refresh rate (VRR) from the control signal, where the ad is based on the VRR.

In some embodiments, determining the ad includes transmitting the VRR to a network, and receiving the ad corresponding to the VRR from the network. In some examples, determining the ad includes transmitting a fingerprint, watermark, cue tone, or metadata corresponding to the content to a network, and receiving a corresponding ad from the network.

Some embodiments include transmitting an SPD or an ALLM corresponding to a control signal received via the HDMI connection, to a network, and receiving an ad corresponding to the SPD or the ALLM from the network. Some embodiments include presenting the ad on a graphics plane of the display device, blending the graphics plane with a video plane comprising a first video frame of the one or more frames, and presenting the blended planes on the display device.

Further embodiments, features, and advantages of the present disclosure, as well as the structure and operation of the various embodiments of the present disclosure, are described in detail below with reference to the accompanying drawings.

BRIEF DESCRIPTION OF THE FIGURES

The accompanying drawings are incorporated herein and form a part of the specification.

In the drawings, like reference numbers generally indicate identical or similar elements. Additionally, generally, the

DETAILED DESCRIPTION

Provided herein are system, apparatus, device, method and/or computer program product embodiments, and/or combinations and sub-combinations thereof, for ad insertion by a display device coupled via a high-definition media interface (HDMI) connection, to a media device where the media device provides media content. When the media device pauses the media content, the display device can determine that a pause event has occurred and insert an ad shown on the display device. In other words, the detection of the pause event can trigger the insertion of a relevant ad. After the pause event is detected, some embodiments include determining the context and/or content of the media content that is paused, and selecting an ad that is customized to the determined context and/or content to be displayed on the display device. In some embodiments, the display device may be coupled via a media interface connection other than HDMI to a media device.

Figure 1:
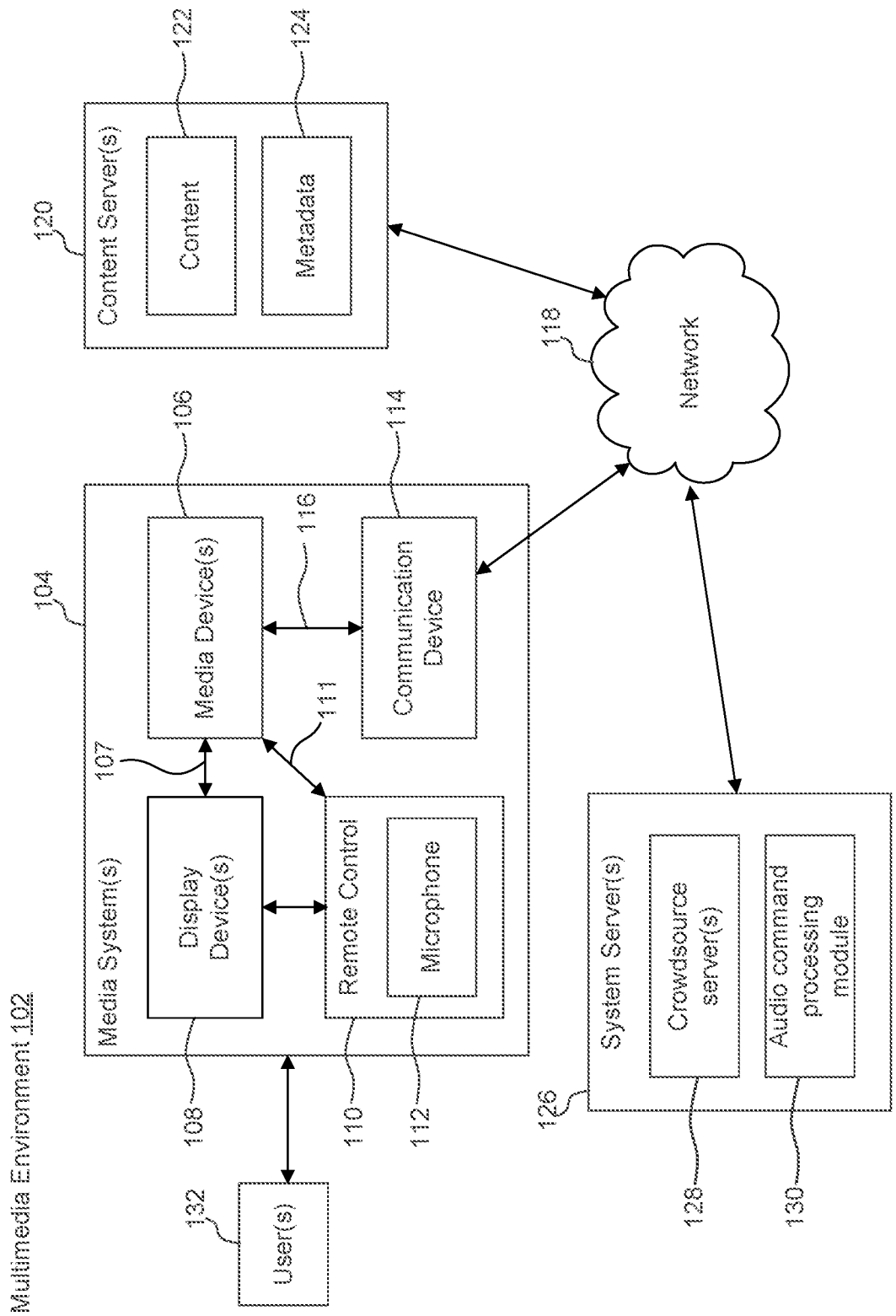
FIG. 1 illustrates a block diagram of a multimedia environment, according to some embodiments.

Various embodiments of this disclosure may be implemented using and/or may be part of a multimedia environment 102 shown in FIG. 1. It is noted, however, that multimedia environment 102 is provided solely for illustrative purposes, and is not limiting. Embodiments of this disclosure may be implemented using and/or may be part of environments different from and/or in addition to the multimedia environment 102, as will be appreciated by persons skilled in the relevant art(s) based on the teachings contained herein. An example of the multimedia environment 102 shall now be described.

Multimedia Environment

FIG. 1 illustrates a block diagram of a multimedia environment 102, according to some embodiments. In a non-limiting example, multimedia environment 102 may be directed to streaming media. However, this disclosure is applicable to any type of media (instead of or in addition to streaming media), as well as any mechanism, means, protocol, method and/or process for distributing media.

The multimedia environment 102 may include one or more media systems 104. A media system 104 could represent a family room, a kitchen, a backyard, a home theater, a school classroom, a library, a car, a boat, a bus, a plane, a movie theater, a stadium, an auditorium, a park, a bar, a restaurant, or any other location or space where it is desired to receive and play streaming content. User(s) 132 may operate with the media system 104 to select and consume content.

Each media system 104 may include one or more media devices 106 each coupled to one or more display devices 108. It is noted that terms such as "coupled," "connected to," "attached," "linked," "combined" and similar terms may refer to physical, electrical, magnetic, logical, etc., connections, unless otherwise specified herein.

Media device 106 may be a streaming media device, DVD or BLU-RAY device, audio/video playback device, cable box, and/or digital video recording device, to name just a few examples. Display device 108 may be a monitor, television (TV), computer, smart phone, tablet, wearable (such as a watch or glasses), appliance, internet of things (IoT) device, and/or projector, to name just a few examples. In some embodiments, media device 106 can be a part of, integrated with, operatively coupled to, and/or connected to its respective display device 108.

Each media device 106 may be configured to communicate with network 118 via a communication device 114. The communication device 114 may include, for example, a cable modem or satellite TV transceiver. The media device 106 may communicate with the communication device 114 over a link 116, wherein the link 116 may include wireless (such as WiFi) and/or wired connections.

In various embodiments, the network 118 can include, without limitation, wired and/or wireless intranet, extranet, Internet, cellular, Bluetooth, infrared, and/or any other short range, long range, local, regional, global communications mechanism, means, approach, protocol and/or network, as well as any combination(s) thereof.

Media system 104 may include a remote control 110. The remote control 110 can be any component, part, apparatus and/or method for controlling the media device 106 and/or display device 108, such as a remote control, a tablet, laptop computer, smartphone, wearable, on-screen controls, integrated control buttons, audio controls, or any combination thereof, to name just a few examples. In an embodiment, the remote control 110 wirelessly communicates with the media device 106 and/or display device 108 using cellular, Bluetooth, infrared, etc., or any combination thereof. The remote control 110 may include a microphone 112, which is further described below.

The multimedia environment 102 may include a plurality of content servers 120 (also called content providers, channels or sources). Although only one content server 120 is shown in FIG. 1, in practice the multimedia environment 102 may include any number of content servers 120. Each content server 120 may be configured to communicate with network 118.

Each content server 120 may store content 122 and metadata 124. Content 122 may include any combination of music, videos, movies, TV programs, multimedia, images, still pictures, text, graphics, gaming applications, advertisements, programming content, public service content, government content, local community content, software, and/or any other content or data objects in electronic form.

In some embodiments, metadata 124 comprises data about content 122. For example, metadata 124 may include associated or ancillary information indicating or related to writer, director, producer, composer, artist, actor, summary, chapters, production, history, year, trailers, alternate versions, related content, applications, and/or any other information pertaining or relating to the content 122. Metadata 124 may also or alternatively include links to any such information pertaining or relating to the content 122. Metadata 124 may also or alternatively include one or more indexes of content 122, such as but not limited to a trick mode index.

The multimedia environment 102 may include one or more system servers 126. The system servers 126 may operate to support the media devices 106 from the cloud. It is noted that the structural and functional aspects of the system servers 126 may wholly or partially exist in the same or different ones of the system servers 126.

The system servers 126 may also include an audio command processing module 130. As noted above, the remote control 110 may include a microphone 112. The microphone 112 may receive audio data from users 132 (as well as other sources, such as the display device 108). In some embodiments, the media device 106 may be audio responsive, and the audio data may represent verbal commands from the user 132 to control the media device 106 as well as other components in the media system 104, such as the display device 108.

In some embodiments, the audio data received by the microphone 112 in the remote control 110 is transferred to the media device 106, which is then forwarded to the audio command processing module 130 in the system servers 126. The audio command processing module 130 may operate to process and analyze the received audio data to recognize the user 132's verbal command. The audio command processing module 130 may then forward the verbal command back to the media device 106 for processing.

Figure 2:
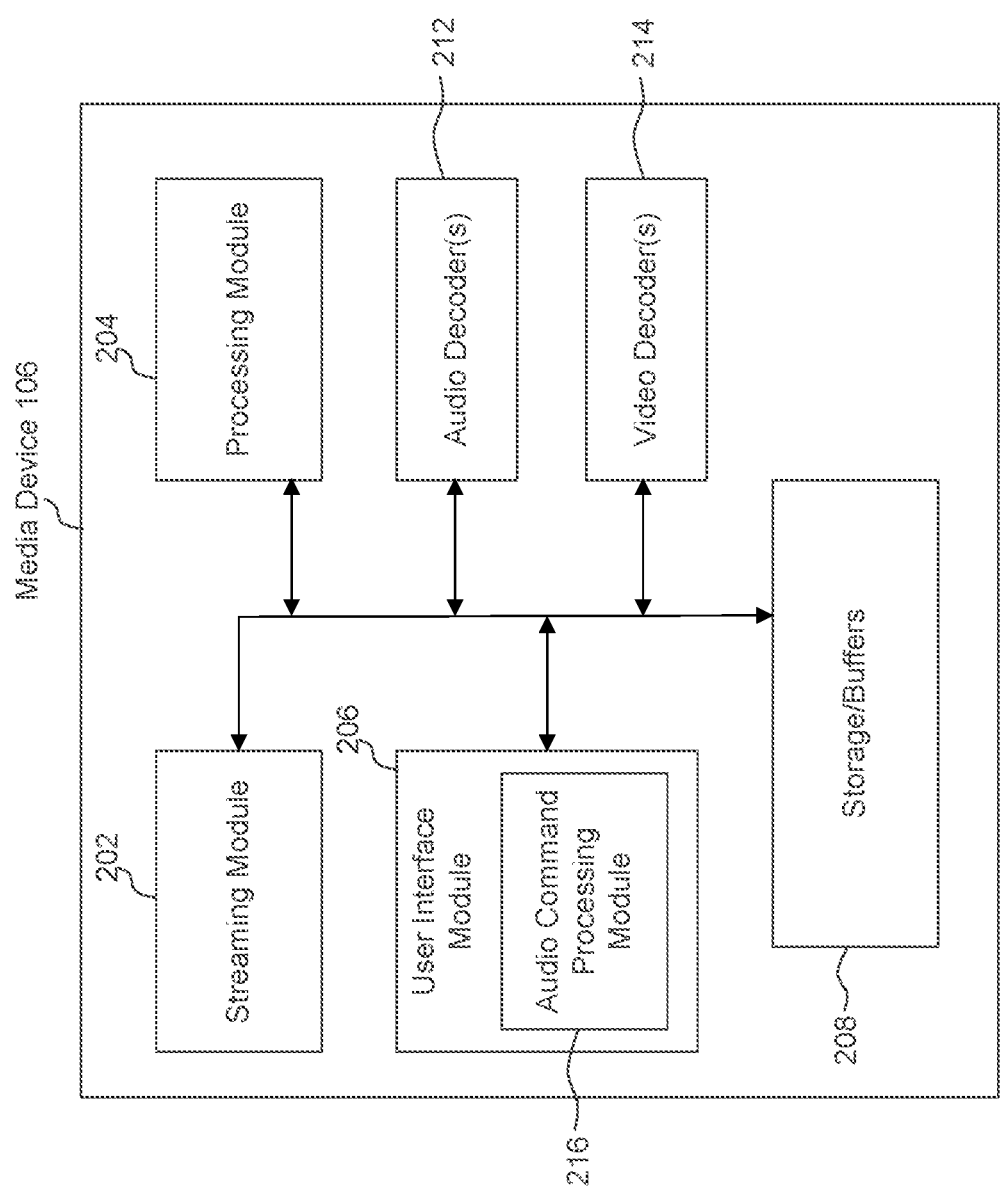
FIG. 2 illustrates a block diagram of a streaming media device, according to some embodiments.

In some embodiments, the audio data may be alternatively or additionally processed and analyzed by an audio command processing module 216 in the media device 106 (see FIG. 2). The media device 106 and the system servers 126 may then cooperate to pick one of the verbal commands to process (either the verbal command recognized by the audio command processing module 130 in the system servers 126, or the verbal command recognized by the audio command processing module 216 in the media device 106).

FIG. 2 illustrates a block diagram of an example media device 106, according to some embodiments. Media device 106 may include a streaming module 202, processing module 204, storage/buffers 208, and user interface module 206. As described above, the user interface module 206 may include the audio command processing module 216.

The media device 106 may also include one or more audio decoders 212 and one or more video decoders 214.

Each audio decoder 212 may be configured to decode audio of one or more audio formats, such as but not limited to AAC, HE-AAC, AC3 (Dolby Digital), EAC3 (Dolby Digital Plus), WMA, WAV, PCM, MP3, OGG GSM, FLAC, AU, AIFF, and/or VOX, to name just some examples.

Similarly, each video decoder 214 may be configured to decode video of one or more video formats, such as but not limited to MP4 (mp4, m4a, m4v, f4v, f4a, m4b, m4r, f4b, mov), 3GP (3gp, 3gp2, 3g2, 3gpp, 3gpp2), OGG (ogg, oga, ogv, ogx), WMV (wmv, wma, asf), WEBM, FLV, AVI, QuickTime, HDV, MXF (OP1a, OP-Atom), MPEG-TS, MPEG-2 PS, MPEG-2 TS, WAV, Broadcast WAV, LXF, GXF, and/or VOB, to name just some examples. Each video decoder 214 may include one or more video codecs, such as but not limited to H.263, H.264, HEV, MPEG1, MPEG2, MPEG-TS, MPEG-4, Theora, 3GP, DV, DVCPRO, DVCPRO, DVCProHD, IMX, XDCAM HD, XDCAM HD422, and/or XDCAM EX, to name just some examples.

Now referring to both FIGS. 1 and 2, in some embodiments, the user 132 may interact with the media device 106 via, for example, the remote control 110. For example, the user 132 may use the remote control 110 to interact with the user interface module 206 of the media device 106 to select content, such as a movie, TV show, music, book, application, game, etc. The streaming module 202 of the media device 106 may request the selected content from the content server(s) 120 over the network 118. The content server(s) 120 may transmit the requested content to the streaming module 202. The media device 106 may transmit the received content to the display device 108 for playback to the user 132.

In streaming embodiments, the streaming module 202 may transmit the content to the display device 108 in real time or near real time as it receives such content from the content server(s) 120. In non-streaming embodiments, the media device 106 may store the content received from content server(s) 120 in storage/buffers 208 for later playback on display device 108.

HDMI Customized Ad Insertion

Referring to FIG. 1, media device 106 may be a streaming media device (e.g., a set top box or a gaming device) coupled to display device 108 via an HDMI connection 107 (e.g., an HDMI cable). For example, user 132 may select HDMI as a source input for media streaming on display device 108. User 132 may use remote control 110 to communicate with media device 106 via radio interface 111. In previous solutions, when user 132 paused media content provided by media device 106 (e.g., a source device) the corresponding video frames may be paused (e.g., halted). In some examples media device 106 may transmit a pause icon in a signal and the pause icon may be presented on display device 108 (e.g., a smart TV). In previous solutions, display device 108 did not detect a pause event. Consequently, display device 108 would not insert an ad during the pause event, or analyze the content and/or context of the paused media content to determine a customized ad, and display the customized ad on a graphics plane of display device 108.

Figure 6:
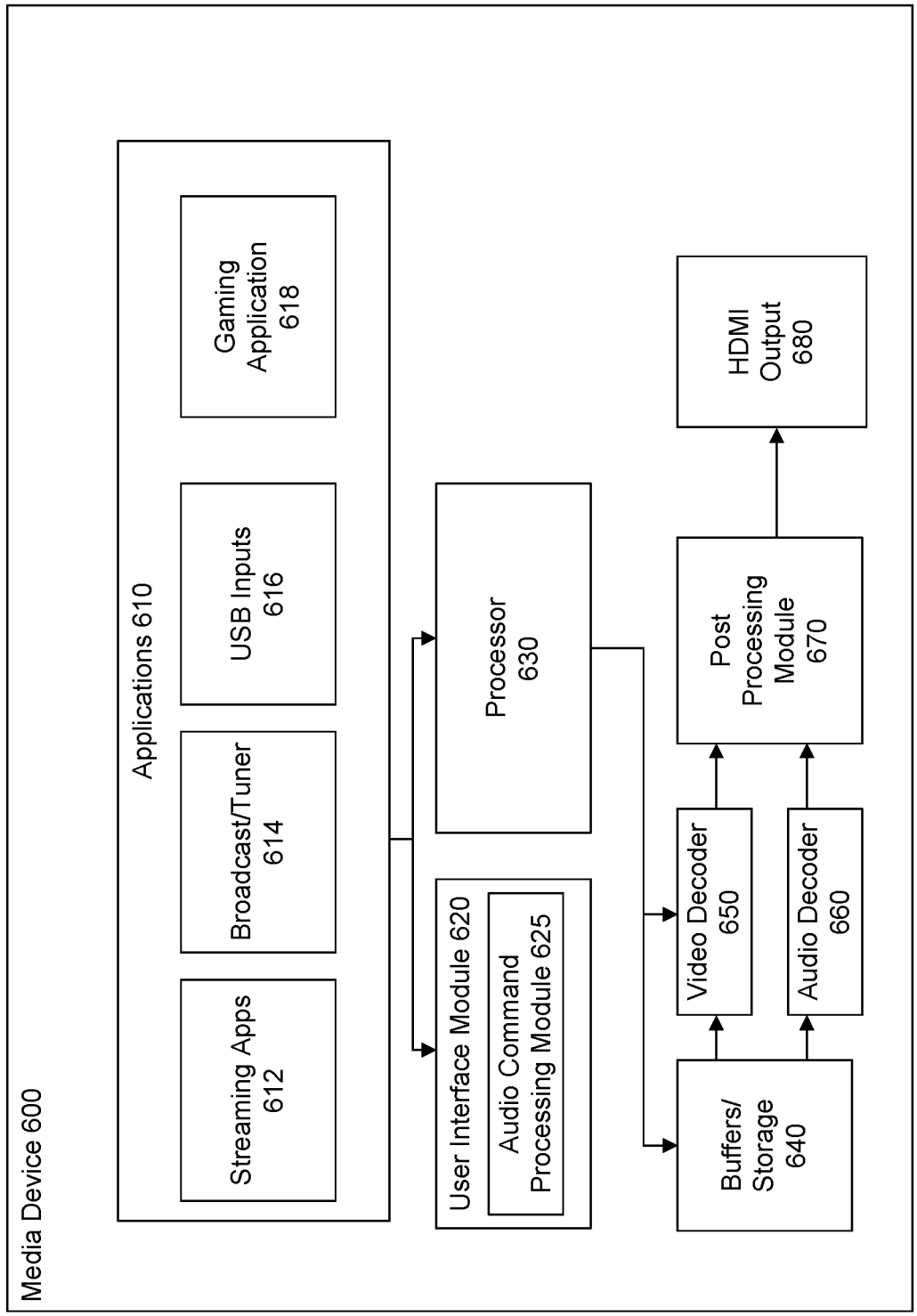
FIG. 6 illustrates a block diagram of a second media device, according to some embodiments.

FIG. 6 illustrates a block diagram of media device 600, according to some embodiments. For illustration purposes and not a limitation, media device 600 may be described with reference to elements from other figures in the disclosure. For example, HDMI output 680 may support HDMI connection 107 of FIG. 1, where HDMI connection 107 is coupled to display device 108 of FIG. 1. User interface module 620 and audio command processing module 625 can correspond to user interface module 206 and audio command processing module 216 of FIG. 2. Processor 630 may correspond to processing module 204 of FIG. 2. Buffers/storage 640, audio decoder 660, and video decoder 650 may correspond to storage/buffers 208, audio decoder(s) 212, and video decoder(s) 214 of FIG. 2.

Media device 600 includes applications 610 that can include streaming applications 612, broadcast/tuner 614, USB inputs 616, and gaming application 618. In some embodiments, media device 600 can be a gaming device. Applications 610 can be a source of information. Processor 630 can extract audio and video data from corresponding applications and place the extracted audio and video data into buffers/storage 640. After audio and video decoding, post processing module 670 can perform scaling of images, color improvements, and lip synching functions, for example, before outputting video frames via HDMI output 680 to a display device (e.g., display device 108 of FIG. 1, display device 108 of FIG. 3, display device 700 of FIG. 7A, display device 705 of FIG. 7B, and/or display device 900 of FIG. 9). In some embodiments, media device 600 transmits a service product description (SPD), auto low latency mode (ALLM), or a variable refresh rate (VRR) to display device 700 of FIG. 7A, display device 705 of FIG. 7B, or display device 900 of FIG. 9.

Figure 8:
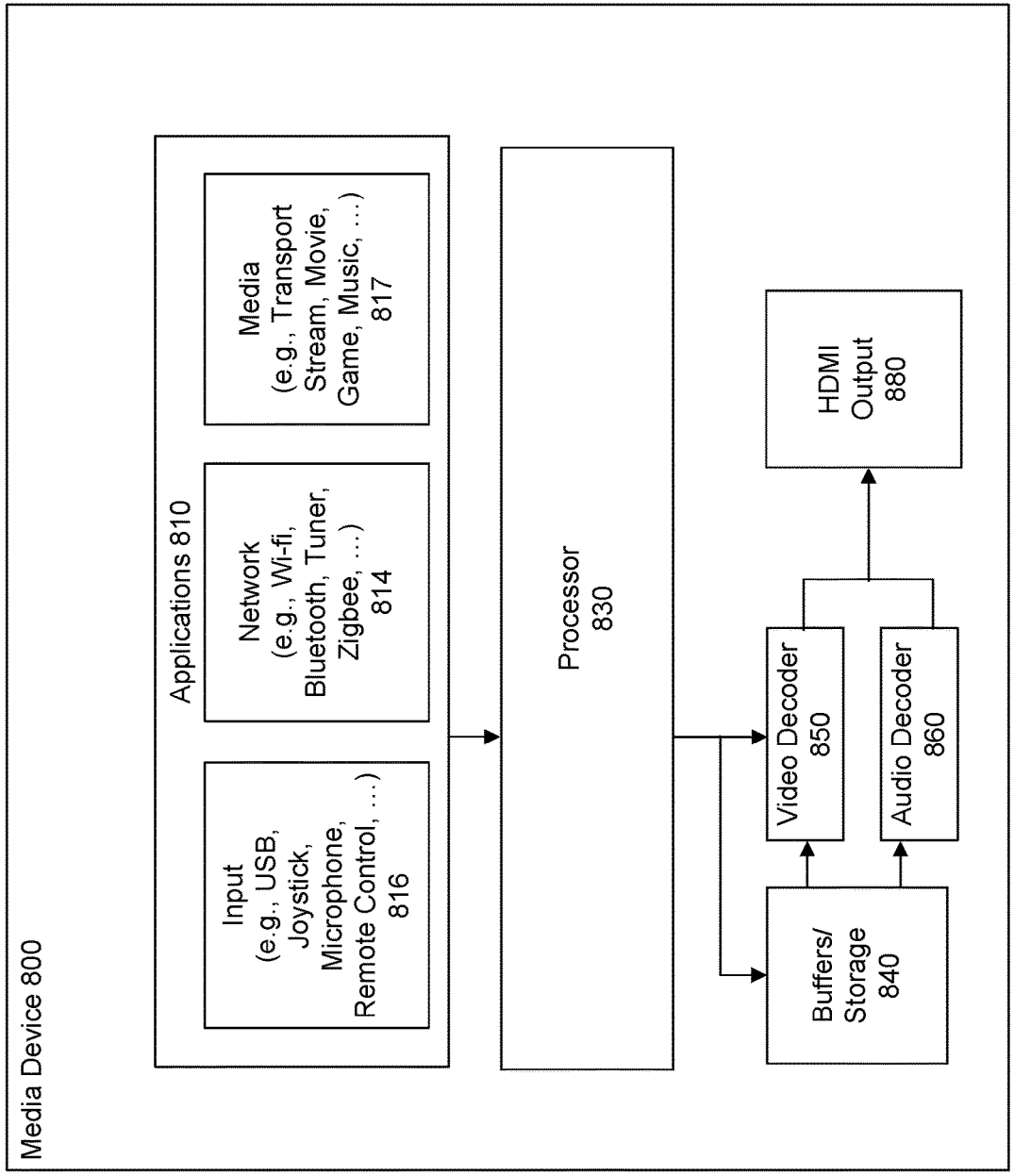
FIG. 8 illustrates a block diagram of a third media device, according to some embodiments.

FIG. 8 illustrates a block diagram of media device 800, according to some embodiments. For illustration purposes and not a limitation, media device 800 may be described with reference to elements from other figures in the disclosure. For example, HDMI output 880, processor 830, buffers/storage 840, audio decoder 860, and video decoder 850 media device 800 may correspond to HDMI output 680, processor 630, buffers/storage 640, audio decoder 660, and video decoder 650 of media device 600 of FIG. 6.

Media device 800 includes applications 810 that may be a data source including but not limited to input application 816, network application 814, and media application 817. Input application 816 can include but is not limited to input applications corresponding to a joystick, a microphone, and/or a remote control device. Network application 814 can include but is not limited to Wi-Fi™, Bluetooth™, Zigbee™, and/or a tuner. Media application 817 can include but is not limited to a transport stream, a movie, a game, and/or music.

Processor 830 can extract audio and video data from corresponding applications and place the extracted audio and video data into buffers/storage 840. After audio and video decoding, output video frames are transmitted via HDMI output 880 to a display device (e.g., display device 108 of FIG. 1, display device 108 of FIG. 3, display device 700 of FIG. 7A, display device 705 of FIG. 7B, and/or display device 900 of FIG. 9). In some embodiments, media device 800 transmits an SPD, an ALLM, or a VRR to display device 700, display device 705 of FIG. 7B, or display device 900 of FIG. 9.

Figure 3:
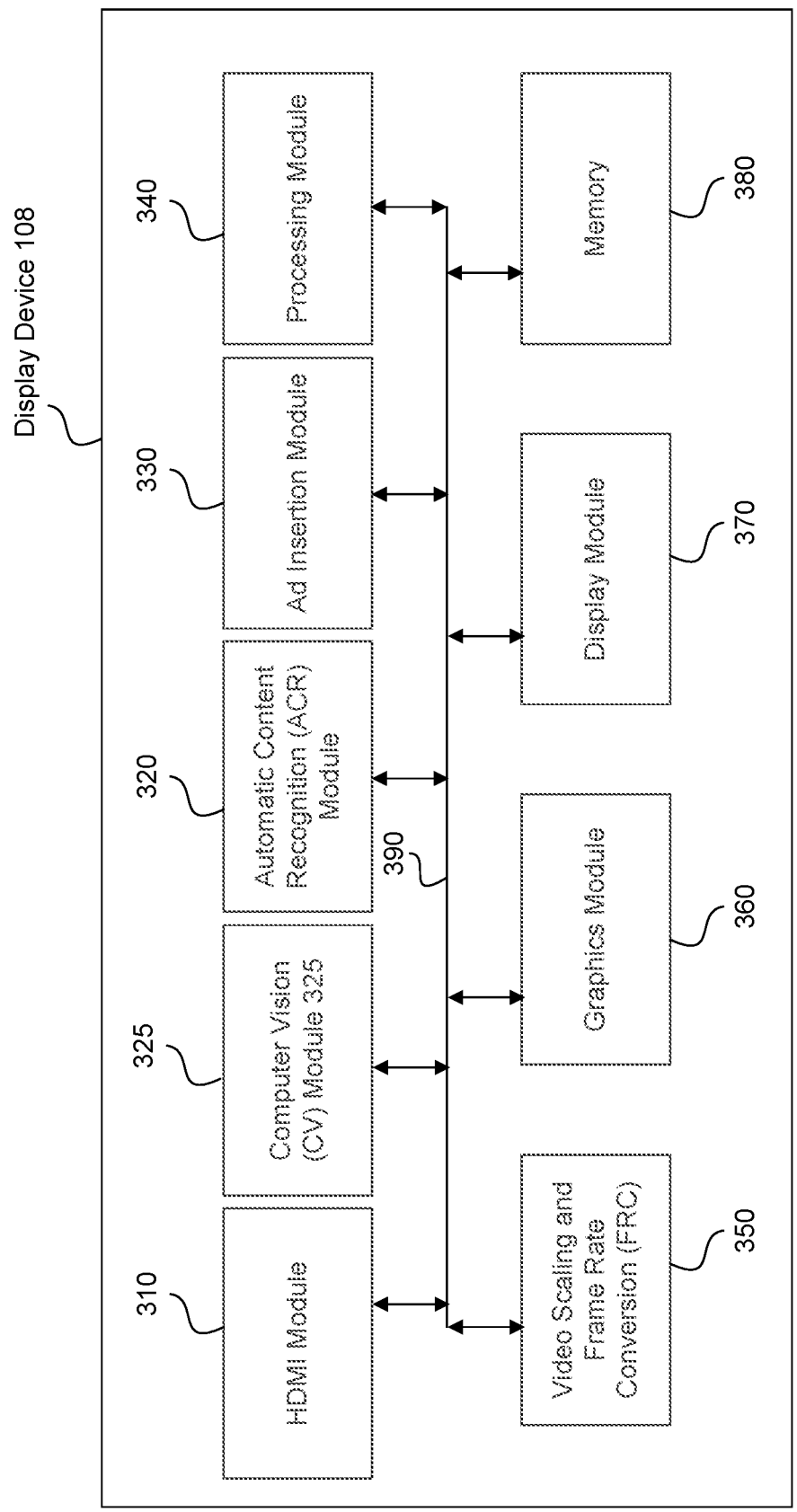
FIG. 3 illustrates a first block diagram of a display device, according to some embodiments.

FIG. 3 illustrates a block diagram of display device 108, according to some embodiments. For illustration purposes and not a limitation, display device 108 may be described with reference to elements from other figures in the disclosure. For example, HDMI module 310 may support HDMI connection 107 of FIG. 1, where HDMI connection 107 is coupled to media device 106 of FIG. 1 or FIG. 2. Display device 108 can include ACR module 320, CV module 325, ad insertion module 330, processing module 340, video scaling and frame rate conversion (FRC) module 350, graphics module 360, display module 370, and memory 380. Bus 390 can coupled the elements of display device 108.

ACR module 320 can analyze a video frame and generate a unique fingerprint and/or unique watermark with information about the content of the video frame. For example, the unique fingerprint and/or watermark may include multiple patches of content within the video frame. The unique fingerprint and/or watermark may be compared against a known reference fingerprint or reference watermark to identify the video content based on the match. The match may identify for example, a movie title, actor, rating, where the movie can be found for viewing, production house, etc. In some examples, the unique fingerprint and/or watermark can correspond to content particular to the video frame itself. The fingerprints and/or watermark generated from different consecutive video frames can be compared. If two or more generated fingerprints and/or watermarks are the same, that can indicate no change in content (e.g., the video or movie may be paused.)

In some embodiments, ACR module 320 can analyze an audio frame and generate a unique fingerprint and/or unique watermark with information about the content of the audio frame. For example, the unique fingerprint and/or watermark may include multiple patches of content within the audio frame. The unique fingerprint and/or watermark may be compared against a known reference fingerprint or reference watermark to identify the audio content based on the match. The match may identify for example, a movie title, actor, rating, where the movie can be found for viewing, production house, etc. In some examples, the unique fingerprint and/or watermark can correspond to content particular to the audio frame itself. The fingerprints and/or watermark generated from different consecutive audio frames can be compared. If two or more generated fingerprints and/or watermarks are the same, that can indicate no change in content (e.g., the audio or movie may be paused.)

In some embodiments ACR module 320 can analyze a video frame and/or an audio frame and generate a unique cue tone (e.g., a cue tone compliant with American National Standards Institute (ANSI)/Society of Cable and Telecommunications Engineers (SCTE) standards defined in ANSI/SCTE 35 2013) with information about the content of the video frame and/or audio frame.

CV module 325 can analyze a video frame and generate metadata. The metadata can be used to recognize objects within the video frame, or one or more video frames. The metadata can for example, recognize images and/or objects within the video frame. Examples of the metadata can include for example, items depicted in the video frame such as a bicycle, car, a beer bottle, a mountain, and/or scenery.

Display device 108 can detect a pause event by using: i) a remote control pass through function; ii) a silent audio signal; and/or iii) pause icon recognition.

In some embodiments, display device 108 may use a remote control pass through function to detect a pause event. For example, media device 106 may be configured to support Consumer Electronics Control (CEC) (e.g., remote control pass through) functions including but not limited to: power on, power off, pause key, play key, and so on. For example, user 132 using remote control 110 can transmit a pause key via radio interface 111 to the media device which transmits the pause key signal to display device 108. In this example, display device 108 can readily detect a pause event based on the pause key signal being received from the media device across HDMI connection 107. The detection of the pause event may be performed in hardware by processing module 340, by processing module 340 executing software stored in memory 380, or a combination thereof. Processing module 340 may include one or more processors, for example.

In some embodiments, display device 108 can detect a pause event based on a silent audio signal received from media device 106 as well as determining that one or more video frames received from media device 106 is not changing. The unchanging video frames in conjunction with the silent audio signal can be used to determine that a pause event is detected. A silent audio signal can be an audio signal corresponding to one or more video or audio frames received from media device 106 that may not be within a human audible frequency range. In other words, the silent audio signal volume is so low that user 132 may not hear the silent audio signal, but the silent audio signal is present. In addition to detecting a silent audio signal, display device 108 can determine that one or more video frames received are not changing by utilizing periodic sampling. In some examples, ACR module 320 and/or CV module 325 can be used to determine that contents are not changing between consecutive video frames.

In some embodiments, a fingerprint and/or watermark can be generated by ACR module 320 for each frame received and the generated fingerprints or watermarks can be compared. If the generated fingerprints and/or watermarks are different, then the one or more video frames are changing and a pause event is unlikely, even if a silent audio signal is detected. If however, the fingerprints and/or watermarks are the same (e.g., fingerprints and/or watermarks from 3-4 consecutive frames are unchanged) and a silent audio signal is detected, then display device 108 determines that a pause event is detected. In other words, user 132 may have paused streaming data at media device 106, perhaps by using remote control 110. The detection of the silent audio signal and/or the comparison of the fingerprints and/or watermarks from different video frames can be performed in hardware by processing module 340, by processing module 340 executing software stored in memory 380, or a combination thereof.

In some embodiments, metadata can be generated by CV module 325 for each frame received and the generated metadata can be compared. If the generated metadata are different, then the one or more video frames are changing and a pause event is unlikely, even if a silent audio signal is detected. If however, the metadata for each frame are the same (e.g., metadata from 3-4 consecutive frames are unchanged) and a silent audio signal is detected, then display device 108 determines that a pause event is detected. In other words, user 132 may have paused streaming data at media device 106, perhaps by using remote control 110. The detection of the silent audio signal and/or the comparison of the metadata from different video frames can be performed in hardware by processing module 340, by processing module 340 executing software stored in memory 380, or a combination thereof.

In some embodiments, display device 108 can detect a pause event based on a recognition of a pause icon. For example, CV module 325 can analyze media content (e.g., one or more video frames) received via HDMI connection 107 from media device 106 to generate metadata that identifies objects in a video frame (e.g., a type of car, an actor, a pause icon, a penguin, or a bee on a flower.) When a pause icon is detected in one or more consecutive video frames received via HDMI module 310, then a pause event is detected. The detection of the pause icon in one or more consecutive video frames can be performed in hardware by processing module 340, by processing module 340 executing software stored in memory 380, or a combination thereof.

After display device 108 determines that a pause event is detected (e.g., based on a remote control pass through function, a silent audio detected with unchanging video frames, or a pause icon detected with no motion in video frames), display device 108 can perform content recognition on the video frame and/or audio frame of the pause event (e.g., a scene of a movie that is paused). In some embodiments, ACR module 320 may generate a fingerprint and/or watermark for the video frame and/or the audio frame. In some embodiments, CV module 325 may generate metadata that corresponds to objects identified or recognized within the video frame.

Display device 108 can use the fingerprint, watermark, and/or the metadata to determine one or more appropriate ads (e.g., advertisements), add the ad(s) to a graphics plane, and present the ad(s) on display device 108 for a portion of or a duration of the pause event. For example, after the pause event detection (e.g., ad insertion module 330 may receive a notice of the pause event detection from processing module 340) the corresponding fingerprint and/or watermark from ACR module 320, and/or the corresponding metadata from CV module 325. Ad insertion module 330 can use the corresponding fingerprint, watermark, and/or metadata to select one or more relevant ads to be presented on display device 108. The fingerprint and/or watermark may correspond to a certain movie title, famous actor, and movie genre. The metadata may correspond to a champagne bottle and mountain scenery. The relevant ads may include the famous actor, a type of champagne, vacation opportunities that include the mountain scenery recognized. The one or more relevant ads may be static (e.g., a still image) or dynamic (e.g., a gif, a short video, an animation, an interactive screen). In some embodiments, input from user 132 regarding the interactive screen (e.g., a survey) can be collected and transmitted to crowdsource server 128. In some embodiments in response to input corresponding to the one or more relevant ads, additional information may be transmitted to a mobile device corresponding to a customer account associated with display device 108 (e.g., email, text).

Ad insertion module 330 may transmit the one or more relevant ads to graphics module 360 to be added to a graphics plane (not shown) of display device 108. The one or more video frames that are received may be received and processed by video scaling and FRC 350. The one or more video frames can be added to a video plane of display device 108 (e.g., a last video frame used in the detection of the pause event can be added to the video plane). In some embodiments, the video plane and the graphics plane can be blended (e.g., merged) together and the data of the blended planes can be received by display module 370 for presentation on display device 108. In some embodiments the graphics plane may be displayed in front of the video plane (e.g., overlaid to be viewed on top of the video plane). In some embodiments the images and/or ads of the graphics plane can be transparent. In some embodiments a selection function from remote control 110 can be passed through media device 106 to display device 108 to make a selection from the graphics plane. The functions above may be performed by processing module 340, executing software of the various modules that may be stored in memory 380, or a combination of hardware and software.

Figure 7A:
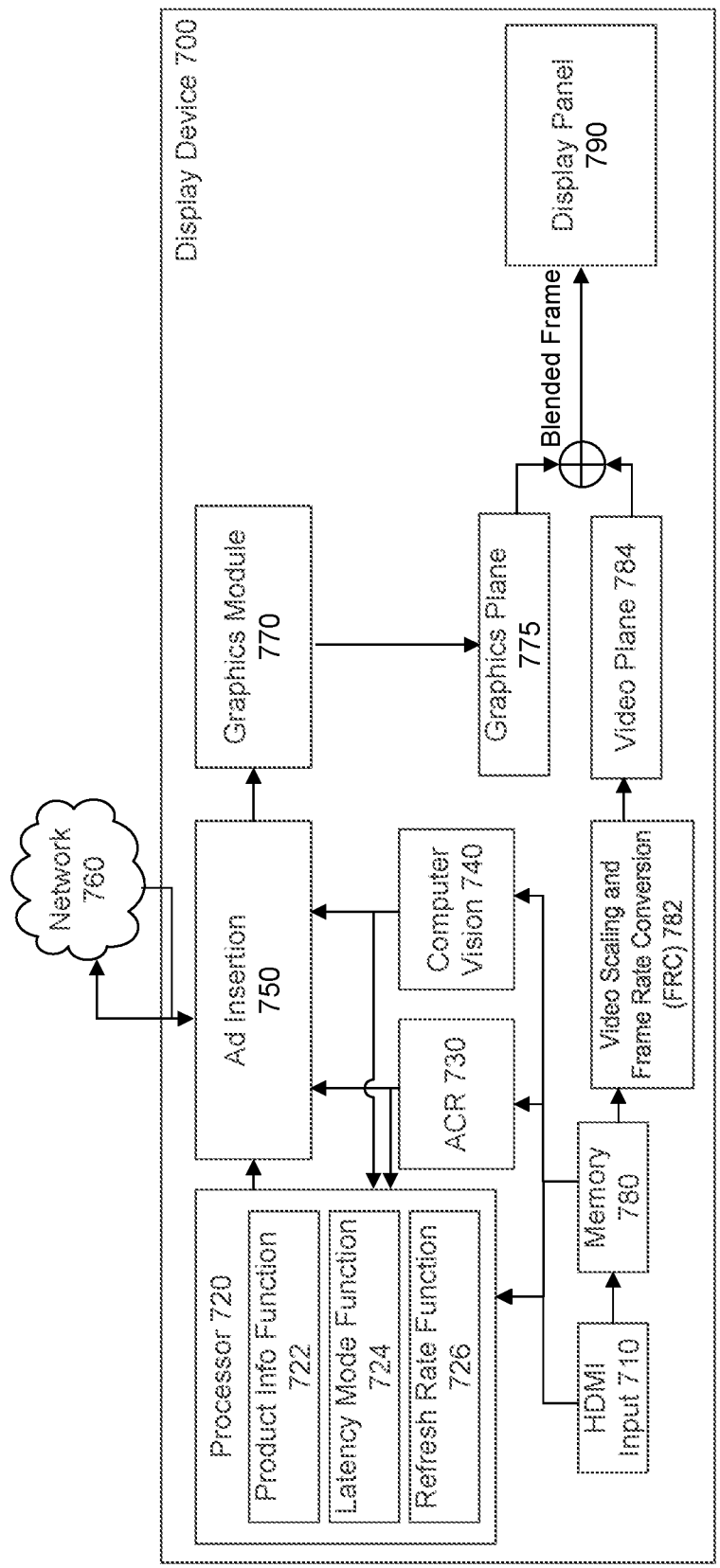
FIG. 7A illustrates a block diagram of a second display device, according to some embodiments.

FIG. 7A illustrates a block diagram of display device 700, according to some embodiments. For example, display device 700 may utilize control signal information received via an HDMI connection in addition to video frames, to determine appropriate and relevant ads to present on display device 700. In some embodiments the relevant ads are presented on display device 700 during a pause event.

For illustration purposes and not a limitation, display device 700 may be described with reference to elements from other figures in the disclosure. For example, HDMI input 710 may support HDMI connection 107 of FIG. 1, where HDMI connection 107 is coupled to media device 106 of FIG. 1. HDMI input 710, ACR 730, computer vision 740, ad insertion 750, graphics module 770, memory 780, and video scaling and FRC 782, and display panel 790 can correspond respectively to HDMI module 310, ACR module 320, CV module 325, ad insertion module 330, graphics module 360, memory 380, video scaling and FRC 350, and display module 370 of FIG. 3.

In some embodiments, display device 700 may be coupled via HDMI connection to a media device (e.g., media device 600 of FIG. 6 or media device 800 of FIG. 8). In some embodiments, media device 600 can be a gaming device. Display device 700 can receive video frames as well as one or more control signals from media device 600 via HDMI input 710. The control signals can include a product information signal, a latency mode signal, or a refresh rate signal from media device 600. Product information function 722 can be a function of processor 720 that determines SPD about the source, such as media device 600, from the product information signal. Examples of SPD include the type of gaming device platform, and/or the model of the gaming device platform. As an example, the product information signal can include an SPD InfoFrame that communicates the name and product type of a source device such as media device 600 (e.g., a video game console) to a sink such as display device 700 (e.g., a television (TV)). When a video game console is coupled to a TV, the video game console may transmit the following SPD via the product information signal to display device 700. The SPD can include the following:

Source Information=8 (indicating e.g., a game)
Vendor Name=Company A
Product Description=Video game console model 1

Using the above SPD information, display device 700 can display an advertisement of a newer model of media device 600, in this example, a newer model than video game console model 1. Display device 700 can also display an advertisement of a competitor product.

Latency mode function 724 can be a function of processor 720 that determines an ALLM from a latency mode signal received from media device 600. The ALLM can indicate whether or not gaming application 618 running (e.g., executing) on media device 600 is a low latency application. Accordingly, display device 700 utilizes resources to enable corresponding low latency performance supporting gaming application 618. For example, the ALLM enables media device 600 (e.g., a source like a video game console) to automatically enable or disable the low latency performance of display device 700 (e.g., a sink like a TV) without requiring a user to navigate to menus of display device 700 (e.g., the sink's menus) to set the optimal latency corresponding to the content of media device 600 (e.g., gaming application 618 such as the video game console gaming content). Media device 600 may transmit the latency mode signal via an HDMI Forum Vendor Specific Info Frame (HF-VSIF). The 5th byte in an HF-VSIF may include an ALLM_Mode field which can be either 0 or 1. If ALLM_Mode=1, media device 600 (e.g., a source like the video game console) requests that display device 700 (e.g., a sink like a TV) switches to game mode. If ALLM_Mode=0, media device 600 requests that display device 700 turns off game mode. Accordingly, latency mode function 724 can determine (a value of) the ALLM that can be used as an indication that the user has started playing a game and hence relevant advertisements related to the game can be displayed to the user via display device 700.

Refresh rate function 726 can be a function of processor 720 that determines a VRR for advanced gaming applications from the refresh rate signal. In some embodiments, the VRR can be a dynamic display refresh rate that can continuously and seamlessly vary on the fly (e.g., change during streaming). The VRR can be transmitted by media device 600 using a Video Timing Extended Metadata Packet (EMP) in the refresh rate signal. Using the VRR, display device 700 can advertise sources and/or applications that offer similarly advanced types of VRR and/or more advanced types of VRR (e.g., VRRs supported by Free Sync offered by AMD graphics cards or GSync offered by NVIDIA graphics cards). In some embodiments, display device 700 can utilize the control signal information (e.g., SPD from product information function 722, ALLM from latency mode function 724, and/or VRR from refresh rate function 726) to determine relevant ads to be presented on display panel 790.

In some embodiments, display device 700 may detect a pause event by using: i) a remote control pass through function; ii) a silent audio signal; and/or iii) pause icon recognition. For example, display device 700 can readily detect a pause event based on a pause key signal (e.g. a remote control pass through function) being received from the media device across an HDMI connection (e.g., HDMI connection 107) via HDMI input 710. The detection of a pause event may be performed in hardware by processor 720, by processor 720 executing software stored in memory 780, or a combination thereof. Processor 720 may include one or more processors, for example. In some embodiments, processor 720 may execute software stored in a different memory (not shown).

In some embodiments, display device 700 can detect a pause event based on a silent audio signal received from the media device (e.g., media device 106, media device 600, or media device 800) as well as determine that one or more video frames received from the media device is not changing. For example, a fingerprint and/or watermark can be generated by ACR 730 for each frame received and the generated fingerprints and/or watermarks can be compared. In some embodiments, CV 740 can generate metadata for each video frame received and generated metadata from consecutive video frames can be compared. When the fingerprints, watermarks, and/or metadata from consecutive video frames are unchanged in conjunction with a silent audio signal, then a pause event is detected. The detection of a pause event based on the silent audio signal and the unchanging video frames may be performed in hardware by processor 720, by processor 720 executing software stored in memory 780, or a combination thereof. Processor 720 may include one or more processors, for example. In some embodiments, processor 720 may execute software stored in a different memory (not shown).

In some embodiments, display device 108 can detect a pause event based on pause icon recognition. For example, CV 740 can analyze media content (e.g., one or more video frames) received via HDMI input 710 from the media device to generate metadata that identifies objects (e.g., a pause icon) in a video frame. When metadata from one or more consecutive video frames received include a pause icon, and a determination is made that the video frames are not changing, a processor can determine that a pause event has been detected. The detection of a pause icon and the unchanging video frames may be performed in hardware by processor 720, by processor 720 executing software stored in memory 780, or a combination thereof. Processor 720 may include one or more processors, for example. In some embodiments, processor 720 may execute software stored in a different memory (not shown).

After display device 700 determines that a pause event is detected (e.g., based on a remote control pass through function, silent audio detected with unchanging video frames, and/or a pause icon recognition with no motion of the video frames), display device 700 can perform content recognition on the video frame of the pause event (e.g., a scene of a movie that is paused) to determine relevant ads to be presented on display panel 790 for a period of or duration of the pause event. For example, ACR 730 may generate a fingerprint and/or watermark for the video frame that enables determination of the video (e.g., the movie) including the video frame, and data associated with the video (e.g., actors, movie title, genre). In some embodiments, computer vision 740 may generate metadata that corresponds to objects (e.g., champagne bottle, mountain scenery) identified or recognized within the video frame. The fingerprints, watermarks, and/or metadata generated can be used to determine relevant ad to be displayed on display device 700 for a portion of or the duration of the pause event.

In some embodiments, after display device 700 determines that a pause event is detected (e.g., based on a remote control pass through function, silent audio detected with unchanging video frames, and/or a pause icon recognition with no motion of the video frames), display device 700 can perform content recognition on an audio frame of the pause event (e.g., a scene of a movie that is paused) to determine relevant ads to be presented on display panel 790 for a period of or duration of the pause event. For example, ACR 730 may generate a fingerprint and/or watermark for the audio frame that enables determination of the content (e.g., the movie) including the audio frame, and data associated with the audio frame (e.g., actors, movie title, genre). The fingerprints, watermarks, and/or metadata (from computer vision 740) generated can be used to determine relevant ad to be displayed on display device 700 for a portion of or the duration of the pause event.

In some embodiments, after display device 700 determines that a pause event is detected (e.g., based on a remote control pass through function, silent audio detected with unchanging video frames, and/or a pause icon and no motion of the video frames), display device 700 can utilize the information obtained from control signals (e.g., SPD, ALLM, and/or VRR) to determine one or more appropriate ads to be presented on display panel 790 during a portion or duration of the pause event. In some embodiments, display device 700 utilizes the content recognition data of one or more video frames (e.g., fingerprints and/or watermarks from ACR 730 and/or metadata from computer vision 740) in conjunction with SPD, ALLM, and/or VRR to determine one or more appropriate ads to be presented on display panel 790 during a portion or duration of the pause event.

For example, after a pause event is detected (e.g., ad insertion 750 may receive a notice of the pause event detection from processor 720), the corresponding fingerprint and/or watermark from ACR 730, the corresponding metadata from CV 740, SPD from product information function 722, ALLM from latency mode function 724, and/or VRR from refresh rate function 726 can be utilized by ad insertion 750 to select one or more relevant ads to be presented on display device 700. For example, the fingerprint and/or watermark may correspond to a certain gaming application 618. The metadata may correspond to the genre of gaming application 618 (e.g., magical creatures, sports arena, vehicles). The SPD may indicate the particular gaming system or gaming console and the model, and the ALLM may indicate low latency is needed along with a certain VRR for advanced gaming. The SPD can include a unique ID that corresponds to a particular hardware device and/or model of the hardware device. In some embodiments, ad insertion 750 determines one or more relevant ads. A relevant ad may include a new model gaming system, a competitor gaming system, and/or one or more gaming applications that utilize a corresponding ALLM and/or corresponding VRR within a similar genre. Many variations are possible. In some embodiments, ad insertion 750 transmits the corresponding fingerprint and/or watermark from ACR 730, the corresponding metadata from CV 740, SPD from product information function 722, ALLM from latency mode function 724, and/or VRR from refresh rate function 726 to network 760 (e.g., a cloud network) for the determination of the relevant ads and receive the relevant ads from network 760.

The one or more relevant ads may be static (e.g., a still image), dynamic (e.g., a gif, a short video, an animation, an interactive screen), or a link for purchasing one or more items in the relevant ad. In some embodiments, input from user 132 regarding the interactive screen (e.g., a survey) can be collected and transmitted to crowdsource server 128. In some embodiments in response to input corresponding to the one or more relevant ads, additional information may be transmitted to a mobile device corresponding to a customer account associated with display device 700 (e.g., email, text). In some embodiments the corresponding fingerprint and/or watermark from ACR 730, the corresponding metadata from CV 740, SPD from product information function 722, ALLM from latency mode function 724, VRR from refresh rate function 726, and/or the one or more relevant ads may be stored in a historical profile corresponding to user 132 and/or media device 600. Ad insertion 750 and/or network 760 may utilize the historical profile in conjunction with current data (e.g., fingerprint and/or watermark from ACR 730, metadata from CV 740, SPD from product information function 722, ALLM from latency mode function 724, and/or VRR from refresh rate function 726, to determine current relevant ads.

Ad insertion 750 may transmit the one or more relevant ads to graphics module 770 to be added to a graphics plane 775 of display device 700. The one or more video frames that are received may be stored in memory 780, and processed by video scaling and FRC 782. The one or more processed video frames can be added to video plane 784 of display device 700 (e.g., a last video frame used in the detection of the pause event can be added to video plane 784). In some embodiments, video plane 784 and graphics plane 775 can be blended (e.g., merged) together and the data of the blended planes can be received by display panel 790 for presentation on display device 700. In some embodiments graphics plane 775 may be displayed in front of video plane 784 (e.g., overlaid to be viewed on top of video plane 784). In some embodiments the images and/or ads of graphics plane 775 can be transparent. In some embodiments a selection function from remote control 110 can be passed through media device 600 to display device 700 to make a selection from the graphics plane. The functions above may be performed by processor 720, executing software of the various modules that may be stored in memory 780, or a combination of hardware and software.

Figure 7B:
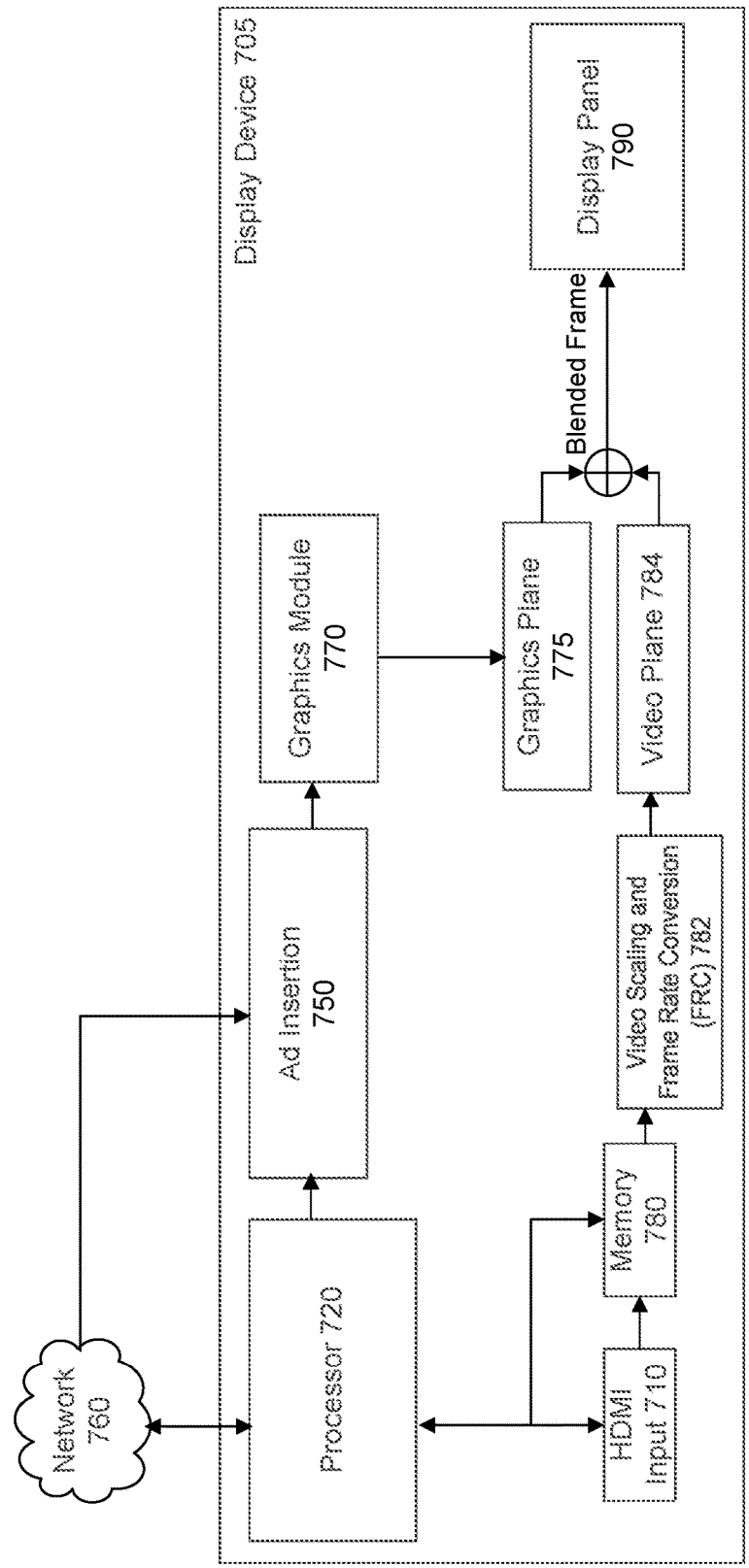
FIG. 7B illustrates a block diagram of a third display device, according to some embodiments.

FIG. 7B illustrates a block diagram of display device 705, according to some embodiments. For illustration purposes and not a limitation, elements of display device 705 may be described with reference to elements from other figures in the disclosure. For example, functions of display device 705 may be similar to that of display device 700 of FIG. 7A, but network 765 includes the following functions: product information function 722, latency mode function 724, refresh rate function 726, ACR 730 and/or computer vision 740, determines relevant ads to be presented on display panel 790, and transmits the relevant ads to ad insertion 750.

Figure 9:
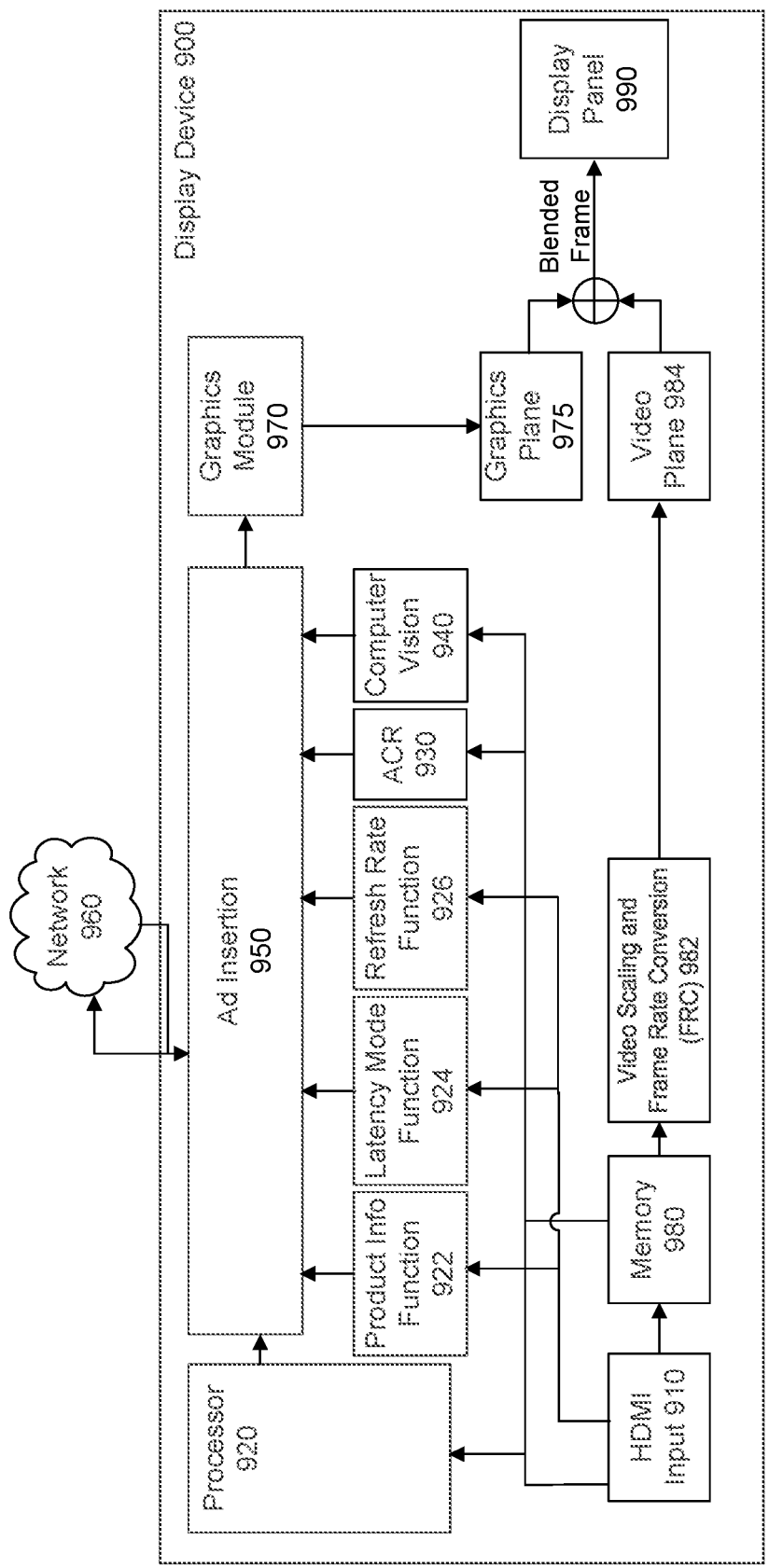
FIG. 9 illustrates a block diagram of a fourth display device, according to some embodiments.

FIG. 9 illustrates a block diagram of display device 900, according to some embodiments. For illustration purposes and not a limitation, elements of display device 900 may be described with reference to elements from other figures in the disclosure. For example, functions of display device 900 may be similar to that of display device 700 of FIG. 7A. For example, HDMI input 910, product information function 922, latency mode function 924, refresh rate function 926, ACR 930, computer vision 940, processor 920, ad insertion 950, graphics module 970, graphics plane 975, video plane 984, memory 980, and video scaling and FRC 982, and display panel 990 can correspond respectively to HDMI input 710, product information function 722, latency mode function 724, refresh rate function 726, ACR 730, computer vision 740, processor 720, ad insertion 750, graphics module 770, graphics plane 775, video plane 784, memory 780, and video scaling and FRC 782, and display panel 790 of FIG. 7A.

In some embodiments, display device 900 can execute one or more functions product information function 922, latency mode function 924, refresh rate function 926, ACR 930 and/or computer vision 940 via corresponding processor(s) (not shown) that are different from processor 920. In some embodiments one or more of the functions product information function 922, latency mode function 924, refresh rate function 926, ACR 930 and/or computer vision 940 may be performed by network 960, processor 920, and/or a different processor (not shown).

In some embodiments, HDMI input 910 receives video frames and control signals from media device 600 and/or media device 800. In some embodiments, network 960 provides the video frames to HDMI input 910.

Figure 4:
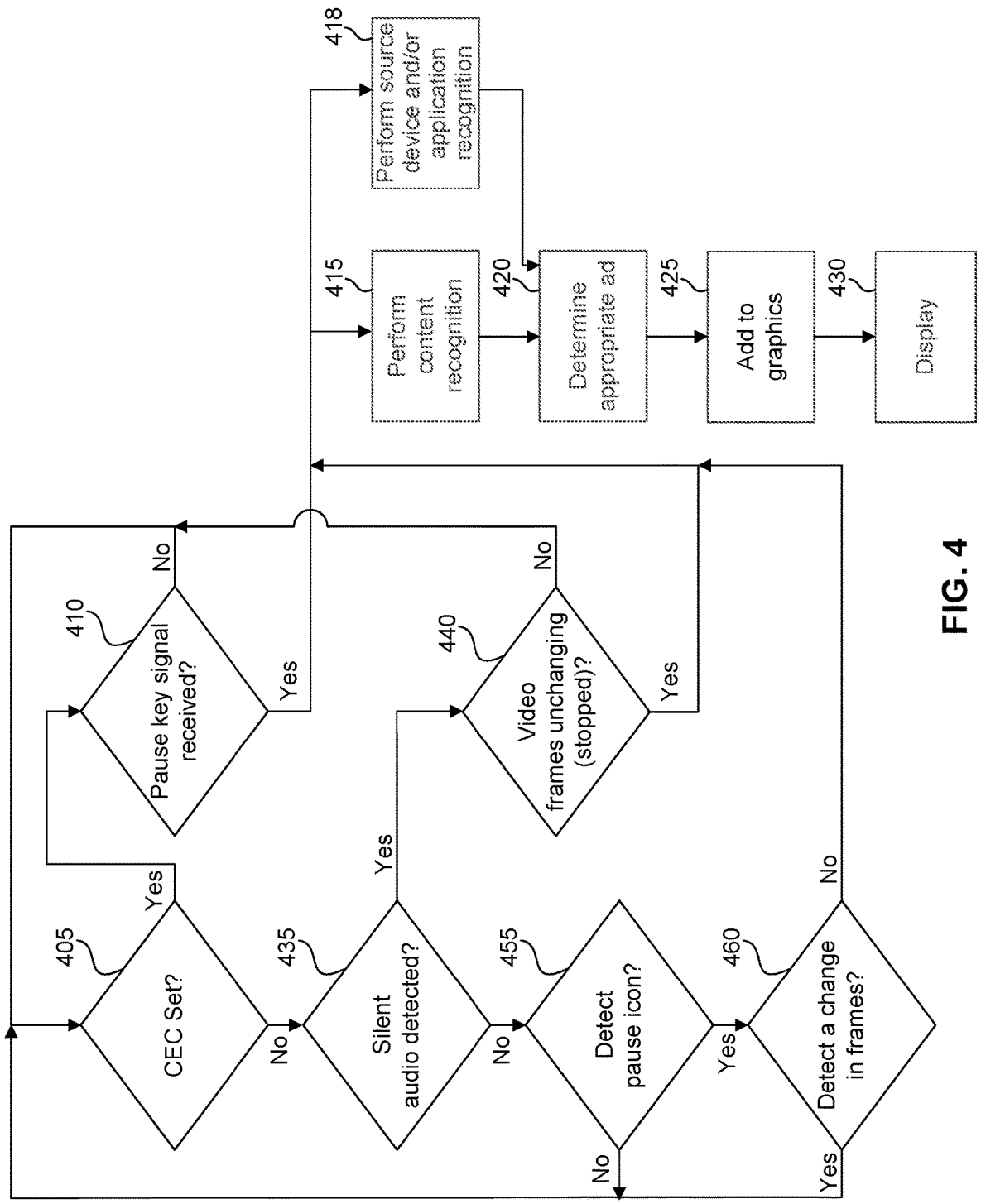
FIG. 4 illustrates a method for a display device, according to some embodiments.

FIG. 4 illustrates method 400 for a display device, according to some embodiments. For illustration purposes and not a limitation, method 400 may be described with reference to elements from other figures in the disclosure. For example, method 400 may be performed by a display device (e.g., display device 108 of FIG. 1 and FIG. 3, display device 700 of FIG. 7A, display device 705 of FIG. 7B, and/or display device 900 of FIG. 9).

At 405, the display device can determine whether CEC (e.g., remote control pass through) functions are enabled. When CEC functions are enabled (e.g., set), method 400 proceeds to 410. Otherwise, method 400 proceeds to 435.

At 410, display device 108 determines whether a pause key signal has been received. For example, user 132 may have selected a pause key on remote control 110. Since CEC functions are enabled, the pause key signal passes through a media device (e.g., media device 106 of FIG. 1 or FIG. 2, media device 600 of FIG. 6, and/or media device 800 of FIG. 8) to a display device (e.g., display device 108 of FIG. 1 and FIG. 3, display device 700 of FIG. 7A, display device 705 of FIG. 7B, or display device 900 of FIG. 9) via an HDMI connection (e.g., HDMI connection 107 of FIG. 1) or HDMI input 710, or HDMI input 910. When a pause key signal has been received, the display device determines that a pause event has been detected, and method 400 proceeds to 415 and 418. Otherwise, method 400 returns to 405.

At 415, when a pause event has been detected, the display device performs content recognition on the one or more video frames received from the media device 106 (e.g., the one or more video frames from which the pause event is determined). In some embodiments, when a pause event has been detected, the display device performs content recognition on the one or more audio frames received from the media device 106 (e.g., the one or more audio frames from which the pause event is determined). The content recognition may be performed by an ACR function (e.g., ACR Module 320, ACR 730, network 760, ACR 930, or Network 960) that determines corresponding fingerprints and/or watermarks, or by a CV function (e.g., CV module 325, computer vision 740, network 760, computer vision 940, and/or network 960) that determines corresponding metadata.

At 418, when a pause event has been detected, the display device performs source device recognition and/or application recognition based on received control signals including but not limited to a product information signal, a latency mode signal, or a refresh rate signal. For example, a product information function enables the display device to determine the SPD that can include the type of gaming device or gaming platform (e.g., a video game console) and the model number. The latency mode function enables the display device to determine the ALLM, whether an application in use works best with low latency (e.g., gaming application 618, input application 816, or media application 817). The refresh rate function enables the display device to determine the VRR and that the application in use may be an advanced (e.g., sophisticated) gaming application.

At 420, the display device determines an appropriate ad corresponding to the determined fingerprints, watermarks, metadata, and/or information from the control signals (e.g., SPD, ALLM, VRR). For example, an ad insertion function (e.g., ad insertion module 330, ad insertion 750, or ad insertion 950) can determine the appropriate ad corresponding to the fingerprints, watermarks, metadata, and/or information from the control signals (e.g., SPD, ALLM, VRR). In some embodiments, the ad insertion function communicates with a network (e.g., network 118 via communication device 114, network 760, or network 960) to exchange the fingerprints, watermarks, metadata, and/or information from the control signals (e.g., SPD, ALLM, VRR) and/or receive one or more relevant ads to be displayed on the display device (e.g., display device 108, display device 700, display device 705, or display device 900) during the pause event. The one or more relevant ads may include a static or dynamic image.

In some embodiments, the display device transmits the video frames and/or control signals received via an HDMI connection to a network (e.g., network 118, network 760, and/or network 960). In some embodiments the network performs one or more of the ACR functions, CV functions, and control signal analysis to determine the one or more fingerprints, watermarks, metadata, and/or information from the control signals (e.g., SPD, ALLM, VRR). Further, the network can determine an appropriate ad corresponding to the fingerprints, watermarks, metadata, and/or information from the control signals (e.g., SPD, ALLM, VRR). The network can transmit the appropriate ad to the ad insertion function (e.g., ad insertion module 330, ad insertion 750, or ad insertion 950).

In some embodiments the network performs one or more of the ACR functions, CV functions, and control signal analysis to determine the one or more fingerprints, watermarks, metadata, and/or information from the control signals (e.g., SPD, ALLM, VRR). A processor (e.g., processor 720, processor 920, or other processor (not shown) of the display device performs the remaining functions that the network does not perform, and transmits the output to the network (e.g., directly or via the ad insertion function). The network utilizes the one or more fingerprints, watermarks, metadata, and/or information obtained from the control signals (e.g., SPD, ALLM, and/or VRR) to determine the one or more appropriate ads, and transmits the one or more appropriate ads to the ad insertion function.

In some embodiments, the processor (e.g., processor 720, processor 920, or other processor (not shown) of the display device performs the remaining functions that the network does not perform, and transmits the output to the ad insertion function. The ad insertion function also receives the one or more fingerprints, watermarks, metadata, and/or information obtained from the control signals (e.g., SPD, ALLM, and/or VRR) determined by the network. The ad insertion function uses the received data from the processor and the network to determine one or more appropriate ads.

The ad insertion function communicates the one or more relevant ads to be displayed on the display device (e.g., display device 108, display device 700, display device 705, or display device 900) during the pause event. The one or more relevant ads may include a static or dynamic image.

At 425, the display device can add one or more of the one or more appropriate ads to a graphics plane of the display device. For example, the ad insertion function may transmit the one or more relevant ads to a graphics module (e.g., graphics module 360, graphics module 770, graphics module 970) to be added to the graphics plane (e.g., graphics plane 775, graphics plane 975).

At 430, the display device presents the one or more appropriate ads during the pause event. For example, the graphics plane and the video plane may blended (e.g., aligned) and a display module (e.g., display module 370, display panel 790, display panel 990) may present the one or more appropriate ads on a screen of the display device. In some embodiments, the display device determines that the pause event ends, and the display device stops presenting the one or more appropriate ads on the screen. The determination that the pause event ends can include but is not limited to: receiving a play key input (e.g., when CEC is set) from remote control 110; detecting that silent audio is not received or that video frames are changing; and/or determining that a pause icon is no longer detected or motion is detected in the video frames (e.g., via a CV function.)

Returning to 435, when CEC functions are not set, the display device can determine whether a silent audio signal is detected. When a silent audio signal is detected, method 400 proceeds to 440. Otherwise, method 400 proceeds to 455.

At 440, when silent audio has been detected, display device 108 determines whether one or more video frames is unchanging (e.g., stopped). For example, processing module 340 can perform periodic sampling on a received video frame. In some examples, the determination of the change may be by performing content recognition functions periodically. When the video frame is determined to be unchanging, method 400 proceeds to 415. When the video frames are changing, method 400 returns to 405 to detect a pause event.

At 455, the display device determines whether a pause icon is detected among the one or more video frames received. For example, the CV function can analyze the content of one or more video frames to recognize a pause icon. When a pause icon is detected, method 400 proceeds to 460. Otherwise, method 400 returns to 405.

At 460, display device 108 determines whether there is a change in the one or more audio and/or video frames received. For example, the CV function can determine whether the content and/or context of one or more of the video frames received changes. In some embodiments, an ACR function determines based on video and/or audio frames whether the content of the video and/or audio frames received have changed. Display device can use the corresponding fingerprints, watermarks, and/or metadata to determine whether content has changed. In some examples, the determination of the change may be performed by content recognition functions periodically. When no change in the audio and/or video frames is detected method 400 proceeds to 415 and/or 418. Otherwise, method 400 returns to 405.

Example Computer System

Figure 5:
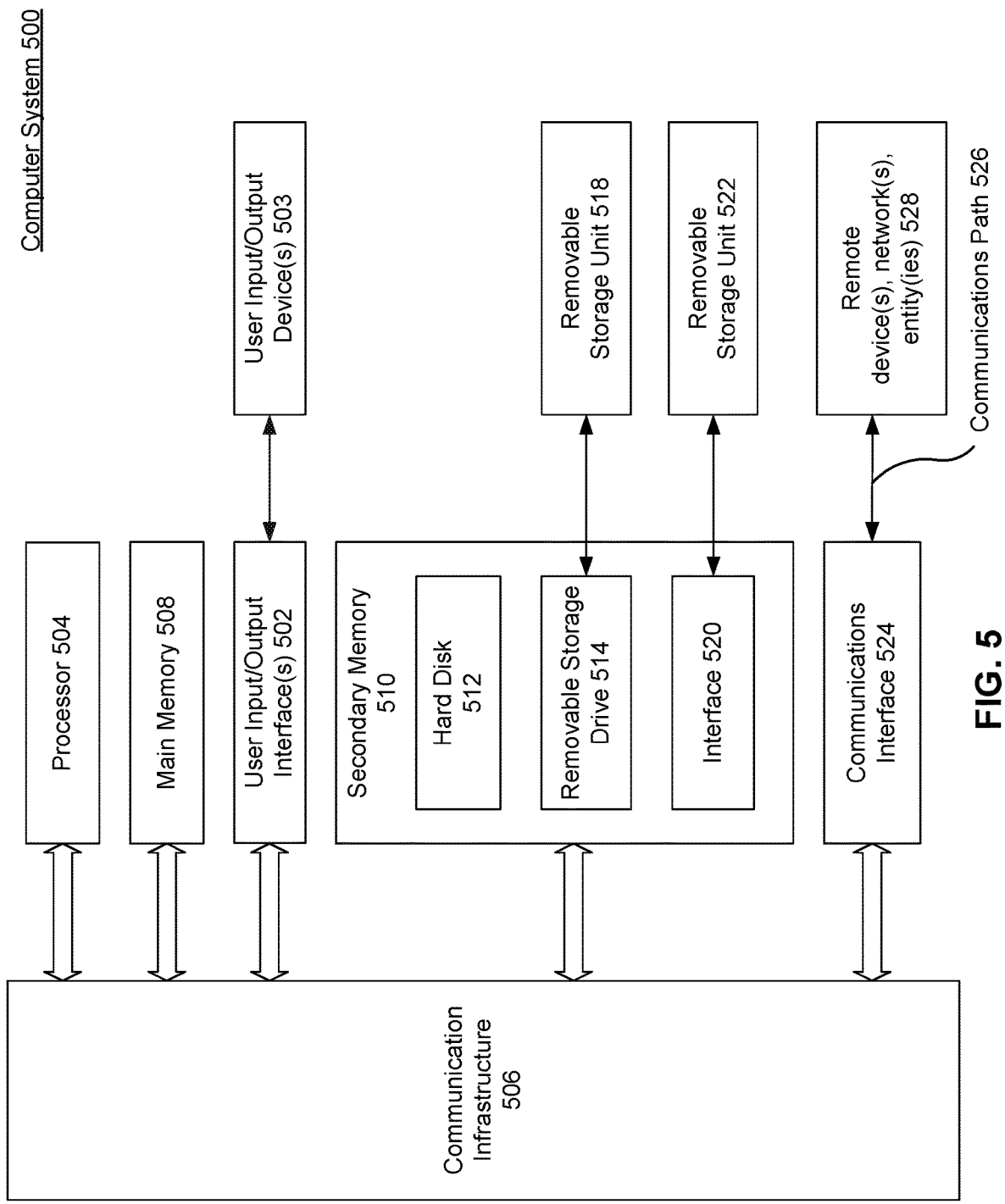
FIG. 5 illustrates an example computer system useful for implementing various embodiments.

Various embodiments may be implemented, for example, using one or more well-known computer systems, such as computer system 500 shown in FIG. 5. For example, media device 106, media device 600, media device 800, display device 108, display device 700, display device 705, or display device 900, and/or method 400 may be implemented using combinations or sub-combinations of computer system 500. Also or alternatively, one or more computer systems 500 may be used, for example, to implement any of the embodiments discussed herein, as well as combinations and sub-combinations thereof.

Computer system 500 may include one or more processors (also called central processing units, or CPUs), such as a processor 504. Processor 504 may be connected to a communication infrastructure 506 (that can be a bus).

Computer system 500 may also include user input/output device(s) 503, such as monitors, keyboards, pointing devices, etc., which may communicate with communication infrastructure 506 through user input/output interface(s) 502.

One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 may also include a main or primary memory 508, such as random access memory (RAM). Main memory 508 may include one or more levels of cache. Main memory 508 may have stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 may include a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 may read from and/or write to removable storage unit 518.

Secondary memory 510 may include other means, devices, components, instrumentalities or other approaches for allowing computer programs and/or other instructions and/or data to be accessed by computer system 500. Such means, devices, components, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB or other port, a memory card and associated memory card slot, and/or any other removable storage unit and associated interface.

Computer system 500 may further include a communication or network interface 524. Communication interface 524 may enable computer system 500 to communicate and interact with any combination of external devices, external networks, external entities, etc. (individually and collectively referenced by reference number 528). For example, communication interface 524 may allow computer system 500 to communicate with external or remote devices 528 over communications path 526, which may be wired and/or wireless (or a combination thereof), and which may include any combination of LANs, WANs, the Internet, etc. Control logic and/or data may be transmitted to and from computer system 500 via communication path 526.

Computer system 500 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 500 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 500 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500 or processor(s) 504), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

Conclusion

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer implemented method for a display device, comprising:
    detecting a pause event in one or more frames received via a high-definition multimedia interface (HDMI) connection;
    receiving a control signal via the HDMI connection;
    detecting an auto low latency mode (ALLM) in the control signal;
    during the pause event, recognizing content within the one or more frames;
    determining an ad based on the ALLM or the content within the one or more frames including:
        transmitting the ALLM corresponding to the control signal to a network; and
        receiving the ad corresponding to the ALLM from the network; and
    presenting the ad on the display device.

2. The computer implemented method of claim 1, wherein the detecting the pause event comprises: receiving a remote control pass through pause signal.

3. The computer implemented method of claim 1, wherein the detecting the pause event comprises:
    detecting a silent audio signal via the HDMI connection; and
    determining that a first video frame and a second video frame of the one or more frames are identical.

4. The computer implemented method of claim 1, wherein the recognizing the content comprises:
    analyzing a first video frame or a first audio frame of the one or more frames using automatic content recognition (ACR) technology; and
    determining, based on the analyzing, a fingerprint, a watermark, or a cue tone corresponding to the first video frame or the first audio frame, wherein the fingerprint, the watermark, or the cue tone is used to identify information about content corresponding to the first video frame or the first audio frame.

5. The computer implemented method of claim 1, wherein the recognizing the content comprises:
    analyzing a first video frame of the one or more frames using CV technology; and determining, based on the analyzing, metadata corresponding to the first video frame, wherein the metadata is used to identify one or more objects corresponding to the first video frame.

6. The computer implemented method of claim 1, further comprising:
determining a service product description (SPD) from the control signal, wherein the determining the ad is further based on the SPD.

7. The computer implemented method of claim 1, further comprising:
detecting a variable refresh rate (VRR) from the control signal, wherein the determining the ad is further based on the VRR.

8. The computer implemented method of claim 7, wherein the determining the ad comprises:
transmitting the VRR to a network; and
receiving the ad corresponding to the VRR from the network.

9. The computer implemented method of claim 1, wherein the determining the ad comprises:
transmitting a fingerprint, a watermark, or metadata corresponding to the content to a network; and
receiving the ad corresponding to the fingerprint, the watermark, or the metadata from the network.

10. The computer implemented method of claim 1, wherein the determining the ad comprises:
transmitting a service product description (SPD) corresponding to the control signal to a network; and
receiving the ad corresponding to the SPD from the network.

11. The computer implemented method of claim 1, wherein the presenting the ad comprises:
presenting the ad on a graphics plane of the display device;
blending the graphics plane with a video plane comprising a first video frame of the one or more frames; and
presenting the blended planes on the display device.

12. A system, comprising:
a memory; and
at least one processor coupled to the memory and configured to:
detect a pause event in one or more frames received via a high-definition multimedia interface (HDMI) connection;
receive a control signal via the HDMI connection;
detect an auto low latency mode (ALLM) in the control signal;
during the pause event, recognize content within the one or more frames;
determine an ad based on the ALLM or the content within the one or more frames wherein to determine the ad, the at least one processor is configured to:
transmit the ALLM corresponding to the control signal to a network; and
receive the ad corresponding to the ALLM from the network; and
present the ad on a display device.

13. The system of claim 12, wherein to detect the pause event, the at least one processor is configured to receive a remote control pass through pause signal.

14. The system of claim 12, wherein to detect the pause event, the at least one processor is configured to:
detect a silent audio signal via the HDMI connection; and
determine that a first video frame and a second video frame of the one or more frames are identical.

15. The system of claim 12, wherein to recognize the content, the at least one processor is configured to:
analyze a first video frame or a first audio frame of the one or more frames using automatic content recognition (ACR) technology; and
determine, based on the analyzing, a fingerprint, a watermark, or a cue tone corresponding to the first video frame or the first audio frame, wherein the fingerprint, the watermark, or the cue tone is used to identify information about content corresponding to the first video frame or the first audio frame.

16. A non-transitory computer-readable medium having instructions stored thereon that, when executed by a computing device, cause the computing device to perform operations comprising:
detecting a pause event in one or more frames received via a high-definition multimedia interface (HDMI) connection;
receiving a control signal via the HDMI connection;
detecting an auto low latency mode (ALLM) in the control signal;
during the pause event, recognizing content within the one or more frames;
determining an ad based on the ALLM or the content within the one or more frames including:
transmitting the ALLM corresponding to the control signal to a network; and
receiving the ad corresponding to the ALLM from the network; and
presenting the ad on a display device.

17. The non-transitory computer-readable medium of claim 16, wherein the operations further comprise:
receiving a control signal via the HDMI connection; and
determining a service product description (SPD) or a variable refresh rate (VRR) from the control signal, wherein the determining the ad is further based on the SPD or the VRR.

18. The non-transitory computer-readable medium of claim 16, wherein the presenting the ad comprises:
presenting the ad on a graphics plane of the display device;
blending the graphics plane with a video plane comprising a first video frame of the one or more frames; and
presenting the blended planes on the display device.

19. The non-transitory computer-readable medium of claim 16, wherein the detecting the pause event comprises:
receiving a remote control pass through pause signal.

20. The non-transitory computer-readable medium of claim 16, wherein the detecting the pause event comprises:
detecting a silent audio signal via the HDMI connection; and
determining that a first video frame and a second video frame of the one or more frames are identical.

* * * * *